US012698004B2

(12) United States Patent (10) Patent No.: US 12,698,004 B2
Kim (45) Date of Patent: Aug. 4, 2026

(54) DEVICE AND METHOD FOR GUIDING BOARDING/ALIGHTING OF VEHICLE

(71) Applicant: HYUNDAI MOBIS CO., LTD., Seoul (KR)

(72) Inventor: Seung Jae Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 203 days.

(21) Appl. No.: 18/243,376

(22) Filed: Sep. 7, 2023

(65) Prior Publication Data

US 2024/0182076 A1    Jun. 6, 2024

(30) Foreign Application Priority Data

Dec. 6, 2022    (KR) ........................ 10-2022-0169147

(51) Int. Cl.
*B60W 60/00*          (2020.01)
*G09B 21/00*          (2006.01)

(52) U.S. Cl.
CPC . *B60W 60/00253* (2020.02); *B60W 2420/403* (2013.01); *B60W 2420/408* (2024.01); *B60W 2540/00* (2013.01); *B60W 2552/45* (2020.02); *G09B 21/006* (2013.01)

(58) Field of Classification Search
None
See application file for complete search history.

(56) References Cited

U.S. PATENT DOCUMENTS

| | | | |
|---|---|---|---|
| 10,580,291 B1 * | 3/2020 | Rothenberg | ......... G05D 1/0088 |
| 2005/0282485 A1 * | 12/2005 | Kato | ...................... B60H 1/243 |
| | | | 454/136 |
| 2016/0357264 A1 | 12/2016 | Tissot | |
| 2020/0124428 A1 * | 4/2020 | Hamilton | ............... G06Q 10/02 |
| 2020/0160709 A1 * | 5/2020 | Ramot | ................ G06Q 10/047 |
| 2021/0191396 A1 * | 6/2021 | Kan | ................... G01C 21/3438 |
| 2022/0284716 A1 * | 9/2022 | Tanaka | ...................... G06T 7/70 |
| 2023/0332912 A1 * | 10/2023 | Buttolo | ............. G01C 21/3629 |
| 2024/0116402 A1 * | 4/2024 | Basu | ................ B60W 50/0097 |

FOREIGN PATENT DOCUMENTS

| | | | | |
|---|---|---|---|---|
| CN | 114906050 A | 8/2022 | | |
| DE | 102018212901 A1 | 2/2020 | | |
| DE | 102019128411 A1 | 4/2020 | | |
| WO | 2020/263334 A1 | 12/2020 | | |
| WO | WO-2022209614 A1 * | 10/2022 | ............... B60S 1/56 |

OTHER PUBLICATIONS

English translation of WO-2022209614-A1 (Year: 2022).*
The Extended European Search Report dated Sep. 16, 2024 issued in European Patent Application No. 23202309.3.

* cited by examiner

*Primary Examiner* — James J Lee
*Assistant Examiner* — Melanie G Huber
(74) *Attorney, Agent, or Firm* — Morgan Lewis & Bockius LLP

(57)          ABSTRACT

A method for guiding boarding/alighting of a vehicle includes collecting body information of an occupant when the occupant approaches the vehicle, determining an arrival location of the vehicle based on a location of the occupant, and providing relative information as a notification based on the body information of the occupant.

16 Claims, 11 Drawing Sheets

▨ WIND DISCHARGER
▨ CAMERA SENSOR
▨ PROXIMITY SENSOR
▨ SPEAKER
▨ VERTICAL LEVEL MEASUREMENT SENSOR

FIG. 5

VEHICLE ARRIVES AT DESTINATION —— S1010

COLLECT SKELETON INFORMATION OF OCCUPANT —— S1020

ADJUST VEHICLE LOCATION —— S1030

VEHICLE DOOR IS OPENED —— S1040

PROVIDE RELATIVE INFORMATION BASED ON OCCUPANT BODY INFORMATION —— S1050

PROVIDE WIND INTENSITIES BASED ON DISTANCE BETWEEN BODY OF OCCUPANT AND ENTRANCE IN STEPWISE MANNER —— S1060

DEVICE AND METHOD FOR GUIDING BOARDING/ALIGHTING OF VEHICLE

Pursuant to 35 U.S.C. § 119(a), this application claims the benefit of earlier filing dates and right of priority to Korean Application No. 10-2022-0169147, filed on Dec. 6, 2022, the contents of which are hereby incorporated by reference herein in their entirety.

BACKGROUND

Field

The present embodiments are applicable to autonomous vehicles (vehicles) in all fields, and more specifically, for example, are also applicable to a vehicle system that the transportation vulnerable, especially, visually impaired people board.

Discussion of the Related Art

Society of Automotive Engineers (SAE), an American automotive engineering society, subdivides autonomous driving levels into a total of six steps, for example, from level 0 to level 5, as follows.

Level 0 (No Automation) is a step in which a driver controls and is responsible for everything in driving. The driver always drives, and a system of an autonomous vehicle performs only auxiliary functions such as emergency notification, etc. At this level, a subject of driving control is human and variable detection and driving responsibility during driving are held by the human.

Level 1 (Driver Assistance) is a step of assisting a driver through adaptive cruise control and lane keeping functions. By activating a system, a driver is assisted by maintaining a speed of an autonomous vehicle, a vehicle-to-vehicle distance, and lanes. At this level, driving control subjects are a human and a system, and both the detection of variables that occur during driving and the driving responsibility are held by the humans.

Level 2 (Partial Automation) is a step in which an autonomous vehicle and a human can control steering and acceleration/deceleration of the autonomous vehicle for a certain period of time within a specific condition. Auxiliary functions such as steering at a gentle curve and maintaining a distance from a car in front are available. However, at this level, the detection of variables during driving and the driving responsibility are held by the human, the driver should always monitor a driving situation, and the driver should intervene immediately in a situation where the system is not aware of it.

Level 3 (Conditional Automation) is the level at which a system is in charge of driving in certain sections of conditions, such as highways, and at which a driver intervenes only in case of danger. The system is in charge of driving control and variable detection during driving, and unlike Level 2, the monitoring is not required. However, if it exceeds the requirements of the system, the system requests the immediate intervention of the driver.

Level 4 (High Automation) is capable of autonomous driving on most roads. Both driving control and driving responsibility are held by a system. Driver intervention is unnecessary on most roads except for restricted situations. However, since driver intervention may be requested under certain conditions such as bad weather, a driving control device through humans is necessary for this level.

Level 5 (Full Automation) is a step of enabling a driving by an occupant only without a driver. The occupant enters only a destination and a system is responsible for driving under all conditions. At Level 5, control devices for steering, acceleration, and deceleration of an autonomous vehicle are unnecessary.

However, when the transportation vulnerable, especially visually impaired people, board the vehicle, the autonomous vehicle only provides whether a door is opened or closed. The autonomous vehicle has a function of audibly providing whether the door is opened or closed, but does not have a function of outputting a warning by comparing body information of the visually impaired people with vertical levels of a bumper and a roof of the vehicle, so that there is a problem of a collision of the transportation vulnerable during boarding.

SUMMARY

To solve the problem described above, one embodiment of the present disclosure is to provide a vehicle boarding/alighting guiding device that provides relative information by analyzing skeleton information of an occupant when visually impaired people board a vehicle, and provides wind when the occupant's body approaches the vehicle.

The problems to be solved in the present disclosure are not limited to the technical problems mentioned above, and other technical problems not mentioned will be clearly understood by those skilled in the art to which the present disclosure belongs from the description below.

One aspect of the present disclosure provides a method for guiding boarding/alighting of a vehicle including collecting body information of an occupant when the occupant approaches the vehicle, determining an arrival location of the vehicle based on a location of the occupant, and providing relative information as a notification based on the body information of the occupant.

In one implementation of the present disclosure, the collecting, by the vehicle, of the body information of the occupant who is the transportation vulnerable may include collecting at least one of knee vertical level information and shoulder width information of the occupant via skeleton information.

In one implementation of the present disclosure, the determining of the arrival location of the vehicle based on the location of the occupant may include determining whether there is a sidewalk at the arrival location of the vehicle.

In one implementation of the present disclosure, the method may further include measuring a gap between the vehicle and the sidewalk when there is the sidewalk at the arrival location of the vehicle, and determining whether the measured gap between the vehicle and the sidewalk is equal to or smaller than a predetermined distance.

In one implementation of the present disclosure, the method may further include determining that the occupant is boarding/alighting the vehicle from/onto the sidewalk when the gap between the vehicle and the sidewalk is equal to or smaller than the predetermined distance.

In one implementation of the present disclosure, the providing of the relative information as the notification based on the body information of the occupant may include providing a guide notification based on a vertical level difference between an entrance of the vehicle and the sidewalk when the occupant boards/alights the vehicle from/onto the sidewalk.

In one implementation of the present disclosure, the method may further include determining that the occupant is boarding/alighting the vehicle from/onto a road surface when the gap between the vehicle and the sidewalk is not equal to or smaller than the predetermined distance.

In one implementation of the present disclosure, the providing of the relative information as the notification based on the body information of the occupant may include providing a guide notification based on a vertical level of the entrance of the vehicle when the occupant boards/alights the vehicle from/onto the road surface.

In one implementation of the present disclosure, the method may further include providing wind when the occupant approaches an entrance of the vehicle.

According to one of the embodiments of the present disclosure, when the transportation vulnerable, especially the visually impaired people, board the vehicle, the guide may be provided for them to safely board/alight the vehicle without colliding with the vehicle.

The effects obtainable from the present disclosure are not limited to the effects mentioned above, and other effects not mentioned will be clearly understood by those skilled in the art from the description below.

BRIEF DESCRIPTION OF THE DRAWINGS

FIG. 2 is a diagram illustrating an example in which an autonomous driving apparatus according to any one of embodiments of the present disclosure is applied to a vehicle.

FIGS. 3 to 4 are diagrams for illustrating a vehicle boarding/alighting guiding device according to one of embodiments of the present disclosure.

FIGS. 5 to 8 are diagrams for illustrating an operation of the transportation vulnerable boarding a vehicle according to embodiments of the present disclosure.

DESCRIPTION OF SPECIFIC EMBODIMENTS

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
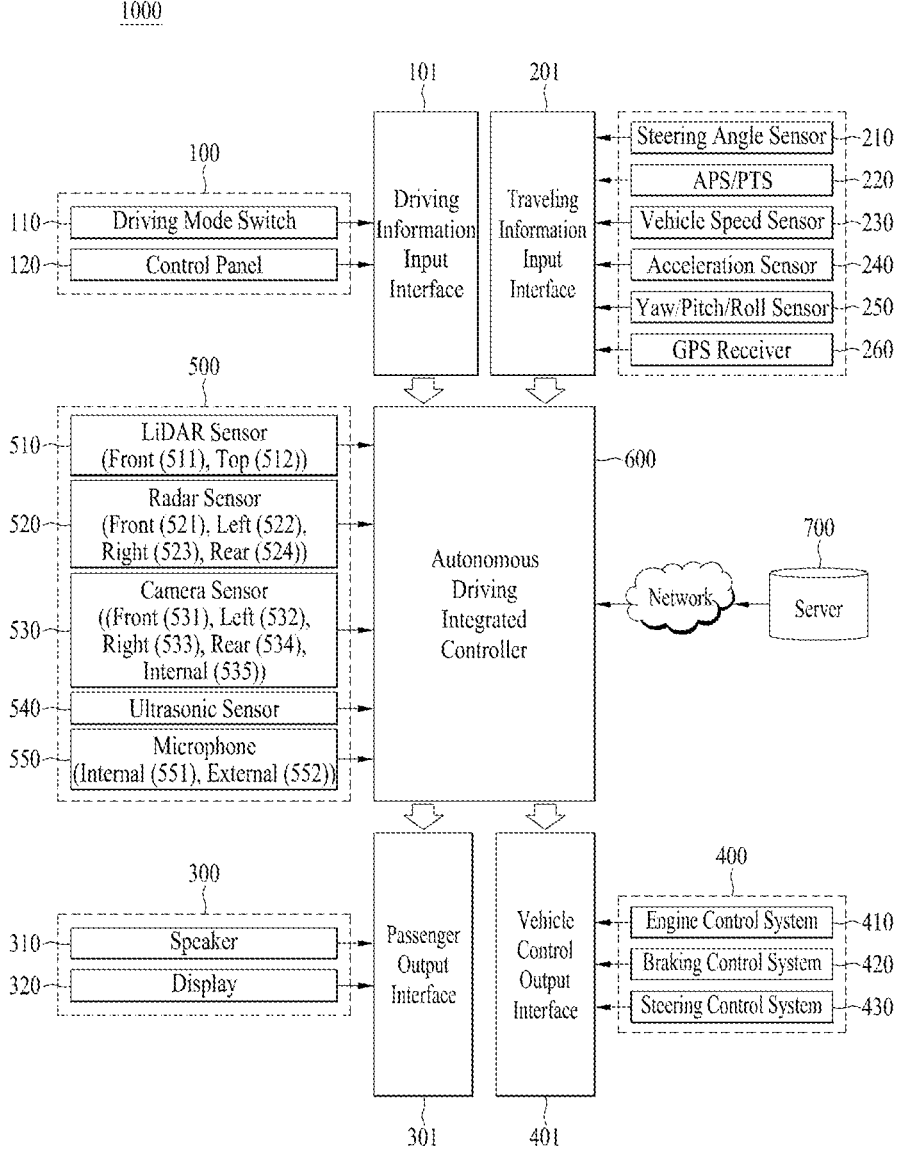
FIG. 1 is an overall block diagram of an autonomous driving control system to which an autonomous driving apparatus according to any one of embodiments of the present disclosure is applicable.
Figure 2:
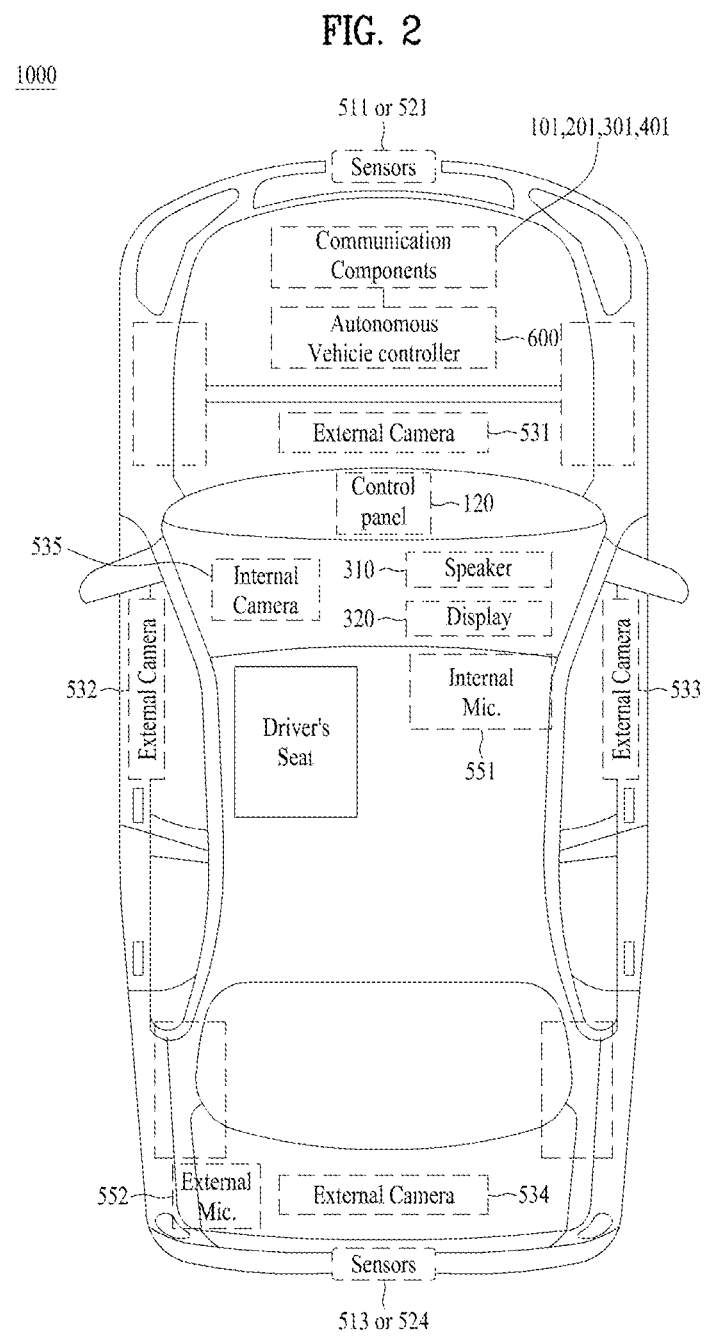

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
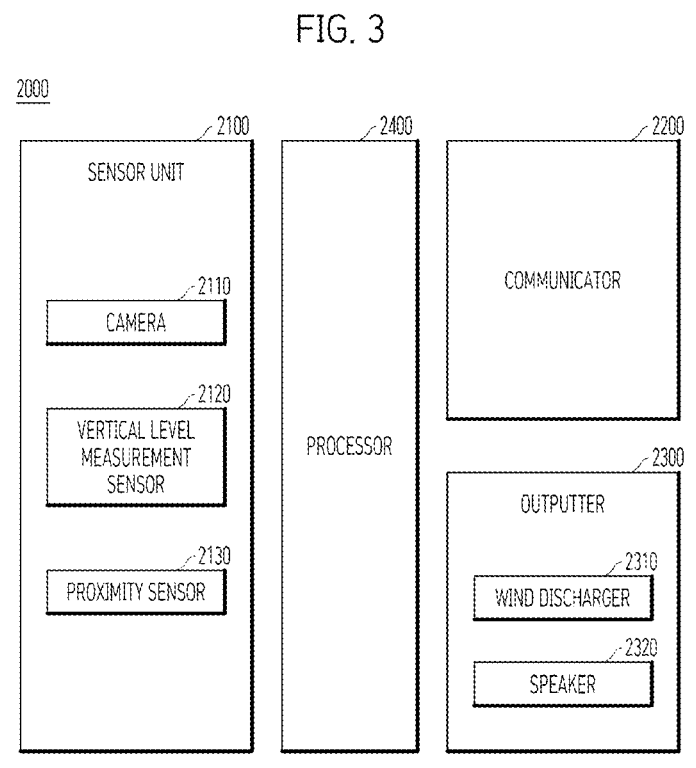
Figure 4:
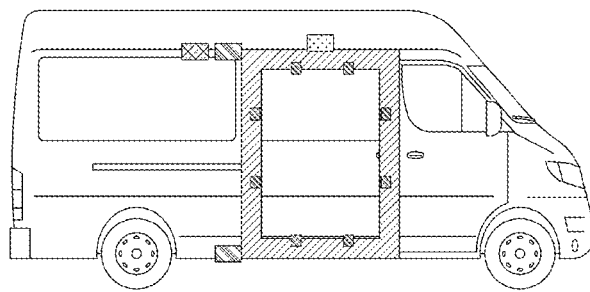

FIGS. 3 to 4 are diagrams for illustrating a vehicle boarding/alighting guiding device according to one of embodiments of the present disclosure.

Referring to FIGS. 3 and 4, a vehicle boarding/alighting guiding device 2000 may include a sensor unit 2100, a communicator 2200, an outputter 2300, and a processor 2400.

The sensor unit 2100 is for recognizing an object around the vehicle 1000, and is able to include at least one of a camera sensor 2110, a vertical level measurement sensor 2120, and a proximity sensor 2130. The sensor unit 2100 may sense an occupant located around the vehicle.

The camera sensors 2110 may be disposed at an upper end and a lower end of a peripheral area of an entrance of the vehicle.

The camera sensor 2110 may capture an image of surroundings of the vehicle 1000 to detect the surrounding object outside the vehicle 1000, or may detect the surrounding object located within ranges of a set distance, a set vertical field of view, and a set horizontal field of view predefined based on a specification thereof.

The camera sensor 2110 may include a front camera sensor, a left camera sensor, a right camera sensor, and a rear camera sensor installed on a front surface, a left side surface, a right side surface, and a rear surface of the vehicle 1000, respectively, but installation locations and the number of installed camera sensors are not limited by a particular embodiment. The processor 2400 of the vehicle 1000 may determine a location (including a distance to the corresponding object), a speed, a moving direction, and the like of the corresponding object by applying predefined image processing to the image captured via the camera sensor.

The camera sensor 2110 may identify occupant skeleton information. The camera sensor 2110 may identify a location of the occupant.

The vertical level measurement sensor 2120 may be disposed at the upper end of the peripheral area of the vehicle entrance. The vertical level measurement sensor 2120 may be disposed around the camera sensor 2110 in a parallel manner.

The vertical level measurement sensor 2120 may identify at least one of a vertical level of the vehicle entrance, a vertical level of a surrounding obstacle, and a vertical level of a sidewalk. The vertical level measurement sensor 2120 may use at least one of a radar sensor and a lidar sensor.

The proximity sensors 2130 may be disposed inwardly and outwardly of rims of the vehicle entrance. At least one proximity sensor 2130 may be disposed on one surface of the rim.

The proximity sensor 2130 may sense a degree of proximity of a body to the vehicle. The proximity sensor 2130 may use at least one of the radar sensor and the lidar sensor.

The radar sensor may detect the surrounding object outside the vehicle 1000 by radiating an electromagnetic wave to a location near the vehicle 1000 and receiving a signal reflected back by the corresponding object, or may detect the surrounding object located within ranges of a set distance, a set vertical field of view, and a set horizontal field of view predefined based on a specification thereof. The radar sensor may include a front radar sensor, a left radar sensor, a right radar sensor, and a rear radar sensor installed on the front surface, the left side surface, the right side surface, and the rear surface of the vehicle 1000, respectively, but installation locations and the number of installed radar sensors are not limited by a particular embodiment. The processor 2400 of the vehicle 1000 may determine the location (including the distance to the corresponding object), the speed, and the direction of movement of the corresponding object in a scheme of analyzing power of the electromagnetic wave transmitted and received via the radar sensor.

The lidar sensor may detect the surrounding object outside the vehicle 1000 by transmitting a laser signal to the location near the vehicle 1000 and receiving a signal reflected back by the corresponding object, or may detect the surrounding object located within ranges of a set distance, a set vertical field of view, and a set horizontal field of view predefined based on a specification thereof. The lidar sensor may include a front lidar sensor, a top lidar sensor, and a rear lidar sensor installed on the front surface, a top surface, and the rear surface of the vehicle 1000, respectively, but installation locations and the number of installed lidar sensors are not limited by a particular embodiment. A threshold value for determining validity of the laser signal reflected back by the corresponding object may be stored in advance in a memory (not shown) of the processor 2400 of the vehicle 1000, and the processor 2400 of the vehicle 1000 may determine the location (including the distance to the corresponding object), the speed, and the moving direction of the corresponding object in a scheme of measuring a time for the laser signal transmitted via the lidar sensor to be reflected back by the corresponding object.

In addition to the camera sensor, the radar sensor, and the lidar sensor, the sensor unit 2100 may further include an ultrasonic sensor, and various types of sensors for detecting the object around the vehicle 1000 may be further employed for the sensor unit 2100.

The communicator 2200 may include one or more transceivers, and may receive user data, control information, a wireless signal/channel, and the like referred to in functions, procedures, proposals, methods, and/or operational flow-charts disclosed herein from one or more other devices via the one or more transceivers. For example, the one or more transceivers may be connected to the processor 2400 and may transmit and/or receive the wireless signal. For example, at least one processor in the processor 2400 may control the one or more transceivers to transmit the user data, the control information, or the wireless signal to the one or more other devices. In addition, the processor 2400 may control the one or more transceivers to receive the user data, the control information, or the wireless signal from the one or more other devices. In addition, the one or more transceivers may be connected to one or more antennas, and the one or more transceivers may be set to transmit and/or receive the user data, the control information, the wireless signal/channel, and the like to and/or from other device(s) via the one or more antennas.

The communicator 2200 may be connected to a remote device outside the vehicle via wireless communication and transmit boarding/alighting information. In addition, the communicator 2200 may be wirelessly connected to the remote device to provide a notification using the remote device instead of an external speaker.

The outputter 2300 may include a wind discharger 2310 and a speaker 2320.

The wind discharger 2310 may be disposed at the vehicle entrance in a form of rims to provide wind to the occupant. Wind may be discharged continuously using the wind discharger 2310 to provide the close occupant within a certain distance from the vehicle with a notification.

The speaker 2320 may be disposed at the upper end of the vehicle entrance to output a guide notification to the occupant.

The processor 2400 may collect occupant body information when the occupant approaches the vehicle. The processor 2400 may collect at least one of knee vertical level and shoulder width information of the occupant from the skeleton information.

The processor 2400 may determine an arrival location of the vehicle based on the location of the occupant. The processor 2400 may determine whether there is the sidewalk at the arrival location of the vehicle. When there is the sidewalk at the arrival location of the vehicle, the processor 2400 may measure a gap between the vehicle entrance and the sidewalk. The processor 2400 may determine whether the measured gap between the vehicle entrance and the sidewalk is equal to or smaller than a predetermined distance. The processor 2400 may determine that the occupant boards/alights the vehicle at the sidewalk when the gap between the vehicle entrance and the sidewalk is equal to or smaller than the predetermined distance.

The processor 2400 may provide relative information as a notification based on the occupant body information. When the occupant boards/alights the vehicle at the sidewalk, the processor 2400 may provide a guide notification based on a vertical level difference between the vehicle entrance and the sidewalk.

The processor 2400 may provide wind when the body of the occupant approaches the entrance of the vehicle.

FIGS. 5 to 8 are diagrams for illustrating an operation of the transportation vulnerable boarding a vehicle according to embodiments of the present disclosure.

Figure 5:
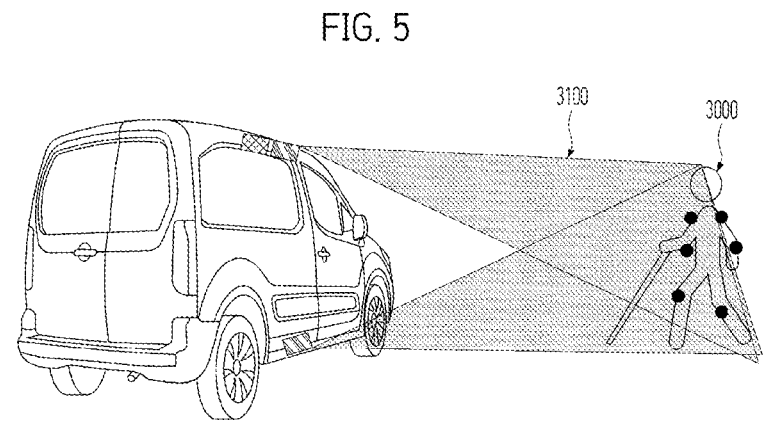

Referring to FIG. 5, when the vehicle arrives at a destination and stops, the boarding/alighting guiding device 2000 may collect skeleton information 3100 of an occupant 3000 using the camera sensor 2110.

The skeleton information 3100 may include at least one of knee vertical level and shoulder width information of the occupant 3000. The knee vertical level information may include relative vertical level information between the occupant 3000 and the vehicle entrance, and the shoulder width information may include vehicle boarding location adjustment information and relative width information with a door width.

The boarding/alighting guiding device 2000 may collect sidewalk vertical level information using the vertical level measurement sensor 2120.

Figure 6:
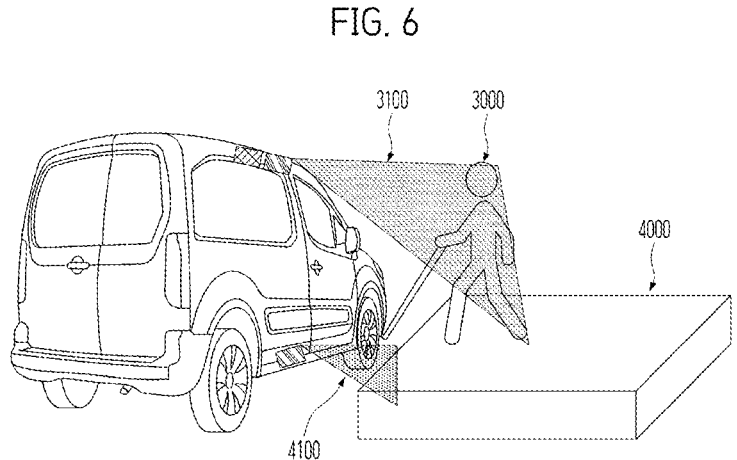

Referring to FIG. 6, when the transportation vulnerable approaches the vehicle to board the vehicle, the boarding/alighting guiding device 2000 may correct the skeleton information 3100 via the vehicle camera sensor. The transportation vulnerable may be people who experience inconvenience when using transportation or walking on a road. For example, the transportation vulnerable may include the physically handicapped, pregnant women, infants, children and adolescents, and the elderly. The physically handicapped may include the visually impaired people, hearing impaired people, and the like. In addition, the transportation vulnerable may further include buggy pushers, wheelchair users, and the like, but may not be limited thereto.

The boarding/alighting guiding device 2000 may identify the occupant location via the vehicle camera sensor and adjust the arrival location of the vehicle for the occupant 3000 to board the vehicle. To this end, the boarding/alighting guiding device 2000 may determine whether a sidewalk 4000 exists. The boarding/alighting guiding device 2000 may determine sidewalk information 4100 when there is the sidewalk 4000. The sidewalk information 4100 may include a vehicle entrance vertical level and a sidewalk vertical level, and a gap between the vehicle entrance and the sidewalk 4000. That is, the boarding/alighting guiding device 2000 may calculate the vehicle entrance vertical level and the sidewalk vertical level and measure the gap between the vehicle entrance and the sidewalk 4000.

The boarding/alighting guiding device 2000 may provide a guide notification corresponding to the measured gap between the vehicle entrance and the sidewalk 4000.

Figure 7:
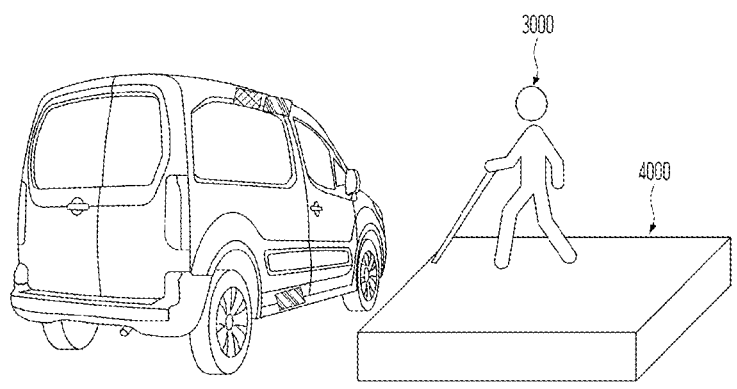

Referring to FIG. 7, when the occupant 3000 standing on the sidewalk 4000 boards the vehicle, the boarding/alighting guiding device 2000 may provide the guide notification via the speaker 2320.

When the gap between the vehicle entrance and the sidewalk 4000 is equal to or smaller than 10 cm, the boarding/alighting guiding device 2000 may provide the guide notification based on a vertical level difference between the vehicle entrance and the sidewalk 4000 because it is a situation in which the transportation vulnerable has to board the vehicle directly from the sidewalk.

The boarding/alighting guiding device 2000 may provide a relative vertical level based on the knee vertical level of the skeleton information 3100 of the occupant 3000 as information.

The boarding/alighting guiding device 2000 may provide a first guide notification when the occupant 3000 approaches the vehicle within 50 cm based on the relative vertical level of the occupant 3000. For example, the first guide notification may be "The gap between the vehicle entrance and the sidewalk is 20 cm. When you're boarding the vehicle directly from the sidewalk, board with caution.".

The boarding/alighting guiding device 2000 may provide a second guide notification when the occupant 3000 approaches the vehicle within 10 cm based on the relative vertical level of the occupant 3000.

For example, the second guide notification may be "The vehicle is flush with your ankles. Lift your feet about 20 cm when boarding the vehicle." or "The vehicle is flush with your ankles. You may board the vehicle without lifting your feet higher than usual when boarding the vehicle.".

Figure 8:
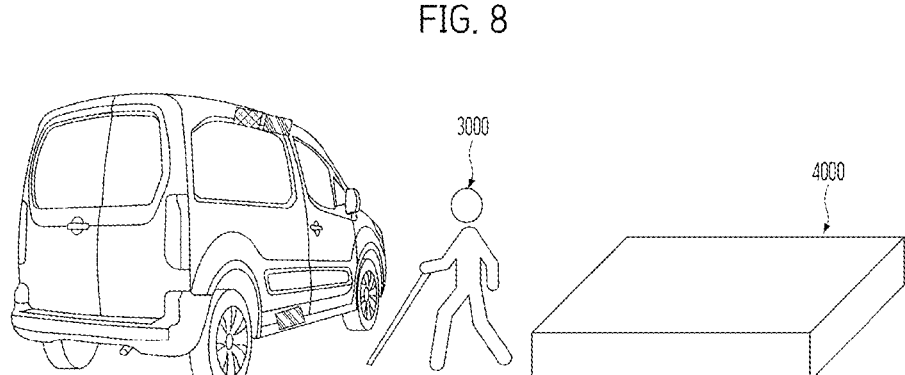

Referring to FIG. 8, when the occupant 3000 standing on a road surface boards the vehicle, the boarding/alighting guiding device 2000 may provide the guide notification.

Because this is the situation in which the occupant 3000 has to board the vehicle from the road surface where the vehicle is located, the boarding/alighting guiding device 2000 may provide the guide notification considering only the vertical level of the vehicle entrance.

When the occupant 3000 approached the vehicle within 10 cm based on the vertical level of the vehicle entrance when boarding the vehicle, the boarding/alighting guiding device 2000 may provide a third guide notification.

For example, the third guide notification may be "The vehicle is flush with your knees. Lift your feet about 50 cm when boarding the vehicle." or "The vehicle is flush with your knees. Lift your feet higher than usual when boarding the vehicle.".

In one example, when the gap between the vehicle entrance and the sidewalk 4000 exceeds 10 cm, the boarding/alighting guiding device 2000 may determine that the occupant 3000 needs to descend from the sidewalk 4000 to the road surface, and additionally provide the guide notification. The boarding/alighting guiding device 2000 may provide a fourth guide notification when it is necessary for the occupant 3000 to descend from the sidewalk to the road based on the vertical level of the vehicle entrance upon boarding.

For example, the fourth guide notification may be "A vertical level difference between the sidewalk and the road is 15 cm. Descend carefully."

Figure 9:
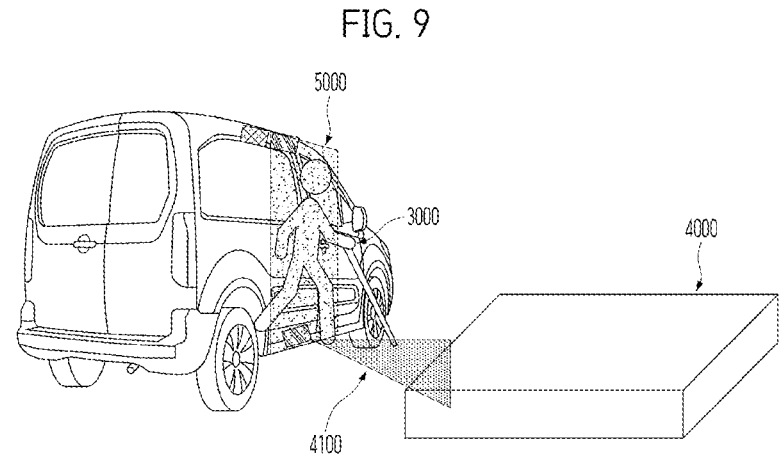
FIG. 9 is a diagram for illustrating an operation of the transportation vulnerable alighting a vehicle according to embodiments of the present disclosure.

FIG. 9 is a diagram for illustrating an operation of the transportation vulnerable alighting a vehicle according to embodiments of the present disclosure.

Referring to FIG. 9, when the vehicle arrives at the destination and the occupant 3000 alights the vehicle, the vehicle may provide relative surroundings information compared with the body information of the occupant 3000.

When arriving at the destination, the boarding/alighting guiding device 2000 may identify the information 4100 of the surrounding sidewalk via the camera sensor. That is, the boarding/alighting guiding device 2000 may identify the gap between the vehicle entrance and the sidewalk 4000 and vertical level information of the sidewalk 4000.

When the occupant 3000 alights the vehicle onto the road surface where the vehicle is located, the boarding/alighting guiding device 2000 may provide alighting information by comparing the vertical level of the vehicle and the body information based on the skeleton information 3100 of the occupant 3000 upon alighting.

When the occupant 3000 alights the vehicle onto the sidewalk 4000, the boarding/alighting guiding device 2000 may provide alighting information based on the body information of the occupant 3000, including the vertical level difference between the vehicle and the road surface upon alighting, and a distance to the sidewalk 4000.

Thereafter, the boarding/alighting guiding device 2000 may sense approach of the occupant 3000 as the proximity sensor 2130 at the rim of the entrance operates when the occupant 3000 alights the vehicle.

The boarding/alighting guiding device 2000 may provide wind 5000 such that the occupant's body (a head, legs, and torso) does not collide. The boarding/alighting guiding device 2000 may discharge the wind 5000 by increasing an intensity thereof as the body of the occupant 3000 approaches the entrance rim.

Figure 10:
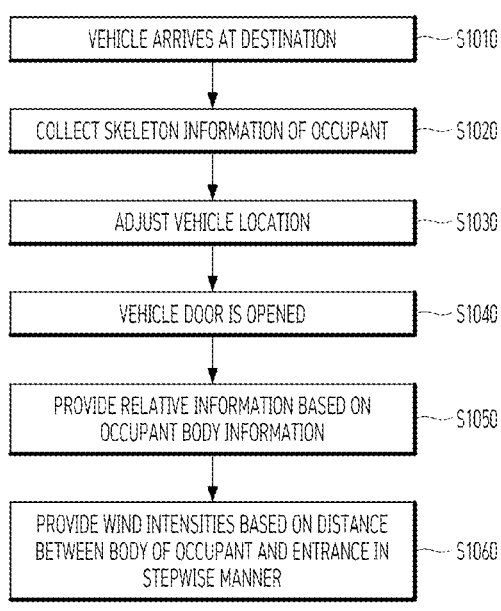
FIG. 10 is a flowchart illustrating a guide method upon boarding of a vehicle according to embodiments of the present disclosure.

FIG. 10 is a flowchart illustrating a guide method upon boarding of a vehicle according to embodiments of the present disclosure.

Referring to FIG. 10, when the vehicle arrives at the destination (S1010), the vehicle boarding/alighting guiding device 2000 according to the present disclosure may collect the skeleton information 3100 of the occupant 3000 (S1020).

After step S1020, the vehicle boarding/alighting guiding device 2000 may adjust the vehicle location based on the skeleton information 3100 of the occupant 3000 (S1030).

After step S1030, when the vehicle door is opened (S1040), the vehicle boarding/alighting guiding device 2000 may provide relative information based on the occupant body information as a notification (S1050).

After step S1050, the vehicle boarding/alighting guiding device 2000 may provide wind intensities based on the distance between the body of the occupant 3000 and the entrance in a stepwise manner (S1060).

Figure 11:
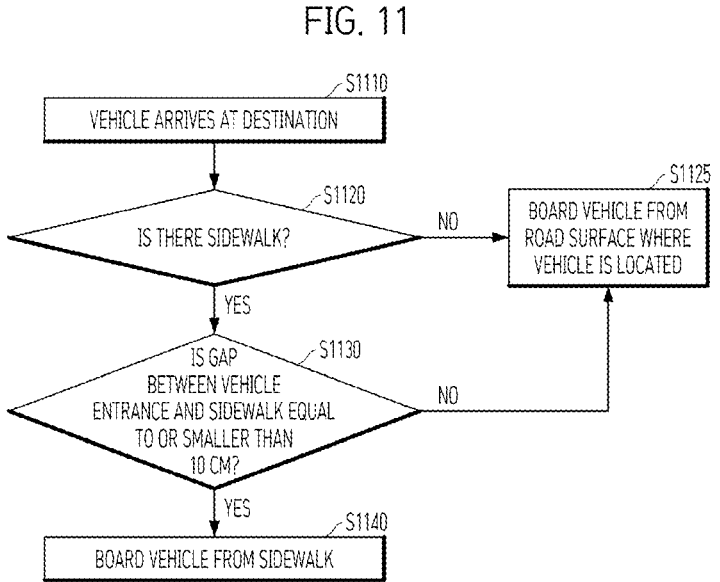
FIG. 11 is a flowchart illustrating a guide method considering whether there is a sidewalk upon guiding boarding/alighting of a vehicle according to embodiments of the present disclosure.

FIG. 11 is a flowchart illustrating a guide method considering whether there is a sidewalk upon guiding boarding/alighting of a vehicle according to embodiments of the present disclosure.

Referring to FIG. 11, when the vehicle arrives at the destination (S1110), the vehicle boarding/alighting guiding device 2000 may determine whether there is the sidewalk at the destination (S1120).

After step S1120, when there is no sidewalk at the destination (No in S1120), the vehicle boarding/alighting guiding device 2000 may determine that this is a situation in which the transportation vulnerable is boarding the vehicle from the road surface where the vehicle is located (S1125).

On the other hand, after step S1120, when there is the sidewalk at the destination (YES in S1120), the vehicle boarding/alighting guiding device 2000 may determine whether the gap between the vehicle entrance and the sidewalk 4000 is equal to or smaller than 10 cm (S1130).

After step S1130, when the gap between the vehicle entrance and the sidewalk 4000 is not equal to or smaller than 10 cm (No in S1130), the vehicle boarding/alighting guiding device 2000 may determine that this is a situation in which the transportation vulnerable is boarding the vehicle from the road surface where the vehicle is located (S1125).

On the other hand, after step S1130, when the gap between the vehicle entrance and the sidewalk 4000 is equal to or smaller than 10 cm (No in S1130), the vehicle boarding/alighting guiding device 2000 may determine that this is a situation in which the transportation vulnerable is boarding the vehicle from the sidewalk (S1140). Thereafter, the vehicle boarding/alighting guiding device 2000 may provide the guide notification based on the vertical level difference between the vehicle and the sidewalk 4000.

That is, the technical idea of the present disclosure may be applied to an entirety of the autonomous vehicle or only to some components inside the autonomous vehicle. The scope of rights of the present disclosure should be determined based on the matters described in the claims.

As another aspect of the present disclosure, the operation of the proposal or the invention described above may also be provided as a code that may be implemented, embodied, or executed by a "computer" (a comprehensive concept including a system on chip (SoC) or a microprocessor), an application storing or containing the code, a computer-readable storage medium, a computer program product, or the like, and this also falls within the scope of the present disclosure.

The detailed descriptions of the preferred embodiments of the present disclosure disclosed as described above have been provided to enable those skilled in the art to implement and practice the present disclosure. Although the description has been made with reference to the preferred embodiments of the present disclosure, those skilled in the art will understand that the present disclosure may be variously modified and changed without departing from the scope of the present disclosure. For example, those skilled in the art may use the components described in the above-described embodiments in a scheme of combining the components with each other.

Accordingly, the present disclosure is not intended to be limited to the embodiments illustrated herein, but is to be accorded the widest scope consistent with the principles and novel features disclosed herein.

What is claimed is:

1. A method for guiding boarding/alighting of an autonomous driving vehicle, the method comprising:
   identifying, by a camera sensor of the autonomous driving vehicle, skeleton information of an occupant who is outside the autonomous driving vehicle;
   collecting, by a processor of the autonomous driving vehicle, body information including at least one of knee vertical level information including relative vertical level information between the occupant and a vehicle entrance and shoulder width information of the occupant via the skeleton information;
   determining, by the processor, an arrival location of the autonomous driving vehicle based on a location of the occupant;
   autonomously adjusting, by the processor, the arrival location of the autonomous driving vehicle for the occupant to board the autonomous driving vehicle;

sequentially providing, by the processor, a plurality of different notifications each corresponding to different vertical level information between the occupant and the vehicle entrance;
   discharging, by a wind discharger, wind to the occupant spaced apart from the autonomous driving vehicle; and
   causing, by the processor, the wind discharger to increase an intensity of the wind as the occupant approaches an entrance rim of the vehicle.

2. The method of claim 1, wherein the determining of the arrival location of the autonomous driving vehicle based on the location of the occupant includes:
   determining, by the processor, whether there is a sidewalk at the arrival location of the autonomous driving vehicle.

3. The method of claim 2, further comprising:
   measuring, by the processor, a gap between an entrance of the autonomous driving vehicle and the sidewalk when there is the sidewalk at the arrival location of the autonomous driving vehicle; and
   determining, by the processor, whether the measured gap between the entrance of the autonomous driving vehicle and the sidewalk is equal to or smaller than a predetermined distance.

4. The method of claim 3, further comprising:
   determining, by the processor, that the occupant is to board/alight the autonomous driving vehicle from/onto the sidewalk when the gap between the entrance of the autonomous driving vehicle and the sidewalk is equal to or smaller than the predetermined distance.

5. The method of claim 3, further comprising:
   determining, by the processor, that the occupant is to board/alight the autonomous driving vehicle from/onto a road surface when the gap between the entrance of the autonomous driving vehicle and the sidewalk is greater than the predetermined distance.

6. The method of claim 1, further comprising:
   providing wind when the occupant approaches an entrance of the autonomous driving vehicle.

7. A computer-readable storage medium for storing at least one program code including instructions for, when executed, causing at least one processor of an autonomous driving vehicle to perform operations, wherein the operations include:
   an operation of collecting body information including at least one of knee vertical level information including relative vertical level information between an occupant and a vehicle entrance and shoulder width information of the occupant who is outside the autonomous driving vehicle via skeleton information of the occupant identified by a camera sensor of the autonomous driving vehicle;
   an operation of determining an arrival location of the autonomous driving vehicle based on a location of the occupant;
   an operation of autonomously adjusting the arrival location of the autonomous driving vehicle for the occupant to board the autonomous driving vehicle;
   an operation of sequentially providing a plurality of different notifications each corresponding to different vertical level information between the occupant and the vehicle entrance;
   an operation of discharging wind to the occupant spaced apart from the autonomous driving vehicle; and
   an operation of increasing an intensity of the wind as the occupant approaches an entrance rim of the vehicle.

8. A device for guiding boarding/alighting of an autonomous driving vehicle, the device comprising:

an object detector configured to recognize an occupant spaced apart from the autonomous driving vehicle;

a communicator configured to be in communication with a remote device;

an outputter including a wind discharger configured to discharge wind to the occupant spaced apart from the autonomous driving vehicle and a speaker; and a processor configured to control at least one of the object detector, the communicator, and the outputter, wherein the processor is configured to:

collect body information of the occupant;

determine an arrival location of the autonomous driving vehicle based on a location of the occupant;

autonomously adjust the arrival location of the autonomous driving vehicle for the occupant to board the vehicle; and provide relative information via the outputter as a notification based on the body information of the occupant, wherein the processor is further configured to cause the wind discharger to increase an intensity of the wind as the occupant approaches an entrance rim of the vehicle.

9. The device of claim 8, wherein the processor is configured to determine whether there is a sidewalk at the arrival location of the autonomous driving vehicle.

10. The device of claim 9, wherein the processor is configured to:

measure a gap between an entrance of the autonomous driving vehicle and the sidewalk when there is the sidewalk at the arrival location of the autonomous driving vehicle; and determine whether the measured gap between the entrance of the autonomous driving vehicle and the sidewalk is equal to or smaller than a predetermined distance.

11. The device of claim 10, wherein the processor is configured to determine that the occupant is to board/alight the autonomous driving vehicle from/onto the sidewalk when the gap between the entrance of the autonomous driving vehicle and the sidewalk is equal to or smaller than the predetermined distance.

12. The device of claim 11, wherein the processor is configured to provide a guide notification based on a vertical level difference between the entrance of the autonomous driving vehicle and the sidewalk when determining that the occupant is to board/alight the autonomous driving vehicle from/onto the sidewalk.

13. The device of claim 10, wherein the processor is configured to determine that the occupant is to board/alight the autonomous driving vehicle from/onto a road surface when the gap between the entrance of the autonomous driving vehicle and the sidewalk is greater than the predetermined distance.

14. The device of claim 13, wherein the processor is configured to provide a guide notification based on a vertical level of the entrance of the autonomous driving vehicle when determining that the occupant is to board/alight the autonomous driving vehicle from/onto the road surface.

15. The device of claim 8, wherein the processor is configured to provide wind when the occupant approaches an entrance of the autonomous driving vehicle.

16. An autonomous driving vehicle, comprising:

a camera sensor configured to identify skeleton information of an occupant who is outside the autonomous driving vehicle;

at least one speaker configured to output auditory feedback;

a wind discharger configured to discharge wind to the occupant spaced apart from the autonomous driving vehicle; and a vehicle boarding/alighting guiding device configured to:

collect body information including at least one of knee vertical level information including relative vertical level information between the occupant and a vehicle entrance and shoulder width information of the occupant via the skeleton information;

determine an arrival location of the autonomous driving vehicle based on a location of the occupant;

autonomously adjust the arrival location of the autonomous driving vehicle for the occupant to board the autonomous driving vehicle;

sequentially provide a plurality of different notifications each corresponding to different vertical level information between the occupant and the vehicle entrance; and increasing an intensity of the wind as the occupant approaches an entrance rim of the vehicle.

\*　\*　\*　\*　\*